United States Patent
Tauchi et al.

(10) Patent No.: US 10,800,258 B2
(45) Date of Patent: *Oct. 13, 2020

(54) VEHICULAR DISPLAY CONTROL DEVICE

(71) Applicant: DENSO CORPORATION, Kariya, Aichi-pref. (JP)

(72) Inventors: Makiko Tauchi, Kariya (JP); Kimiaki Tanaka, Kariya (JP); Akira Kamiya, Kuwana (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 103 days.

This patent is subject to a terminal disclaimer.

(21) Appl. No.: 16/045,783

(22) Filed: Jul. 26, 2018

(65) Prior Publication Data

US 2018/0354365 A1 Dec. 13, 2018

Related U.S. Application Data

(63) Continuation of application No. 15/128,570, filed as application No. PCT/JP2015/001830 on Mar. 30, 2015, now Pat. No. 10,065,503.

(30) Foreign Application Priority Data

Mar. 31, 2014 (JP) .................................. 2014-073787

(51) Int. Cl.
*B60K 35/00* (2006.01)
*B60R 1/00* (2006.01)
(Continued)

(52) U.S. Cl.
CPC ................ *B60K 35/00* (2013.01); *B60R 1/00* (2013.01); *G02B 27/01* (2013.01);
(Continued)

(58) Field of Classification Search
CPC ............ B60K 35/00; B60K 2350/1084; B60K 2350/2008; B60K 2350/352;
(Continued)

(56) References Cited

U.S. PATENT DOCUMENTS 5,612,686 A 3/1997 Takano et al.
10,065,503 B2 * 9/2018 Tauchi ............... G02B 27/0101

FOREIGN PATENT DOCUMENTS

JP H07096806 A 4/1995
JP H08083397 A 3/1996
(Continued)

*Primary Examiner* — Sath V Perungavoor
*Assistant Examiner* — Tyler B Edwards
(74) *Attorney, Agent, or Firm* — Harness, Dickey & Pierce, P.L.C.

(57) ABSTRACT

A vehicular display control device includes: a display control unit for controlling a display device to superimpose an image on a surrounding view of the vehicle; and a sensor operation detecting unit for detecting whether an obstacle sensor detecting an obstacle around the vehicle is in operation. When the obstacle sensor is in operation, the display control unit: transforms a detection target area, which falls in a detection range of the obstacle sensor and expands from the vehicle to a periphery along a road surface, into a detection target image represented from a viewpoint of a driver of the vehicle; and displays a transformed image to be superimposed on the surrounding view of the vehicle.

13 Claims, 14 Drawing Sheets

(51) Int. Cl.
*G06F 3/147* (2006.01)
*G09G 5/00* (2006.01)
*G02B 27/01* (2006.01)
*G05D 1/02* (2020.01)
*G08G 1/16* (2006.01)
*G06K 9/00* (2006.01)

(52) U.S. Cl.
CPC ....... *G02B 27/0101* (2013.01); *G05D 1/0231* (2013.01); *G06F 3/147* (2013.01); *G06K 9/00805* (2013.01); *G08G 1/165* (2013.01); *G08G 1/166* (2013.01); *G09G 5/003* (2013.01); *B60K 2370/179* (2019.05); *B60K 2370/188* (2019.05); *B60K 2370/52* (2019.05); *B60K 2370/736* (2019.05); *B60R 2300/301* (2013.01); *B60R 2300/60* (2013.01); *G02B 2027/014* (2013.01); *G02B 2027/0138* (2013.01); *G02B 2027/0183* (2013.01); *G09G 2320/0233* (2013.01); *G09G 2340/10* (2013.01); *G09G 2340/12* (2013.01); *G09G 2380/10* (2013.01)

(58) Field of Classification Search
CPC ........ B60K 2350/901; B60K 2370/179; B60K 2370/188; B60K 2370/52; B60K 2370/736; B60R 1/00; B60R 2300/301; B60R 2300/60; G02B 2027/0138; G02B 2027/014; G02B 2027/0183; G02B 27/01; G02B 27/0101; G05D 1/0231; G06F 3/147; G06K 9/00805; G08G 1/165; G08G 1/166; G09G 2320/0233; G09G 2340/10; G09G 2340/12; G09G 2380/10; G09G 5/003

See application file for complete search history.

(56) References Cited

FOREIGN PATENT DOCUMENTS

| | | | |
|---|---|---|---|
| JP | 2003005834 | A | 1/2003 |
| JP | 2005067514 | A | 3/2005 |
| JP | 2010244474 | A * | 10/2010 |
| JP | 2012208566 | A * | 10/2012 |
| JP | 2013041444 | A | 2/2013 |

* cited by examiner

RELATIVE SPEED: LARGE

RELATIVE SPEED: SMALL

VEHICULAR DISPLAY CONTROL DEVICE

CROSS REFERENCE TO RELATED APPLICATION

This application is a continuation Application of U.S. application Ser. No. 15/128,570 filed Sep. 23, 2016 which is a U.S. National Phase Application under 35 U.S.C. 371 of International Application No. PCT/JP2015/001830 filed on Mar. 30, 2015 and published in Japanese as WO 2015/151500 A1 on Oct. 8, 2015 and claims the benefit of priority from Japanese Patent Application No. 2014-073787 filed on Mar. 31, 2014. The entire disclosures of all of the above applications are incorporated herein by reference.

TECHNICAL FIELD

The present disclosure relates to a vehicular display control device for displaying an image.

BACKGROUND ART

There has hitherto been known a technique of detecting an obstacle in surroundings of a vehicle by use of a sensor such as an imaging device, a sonar, or a millimeter-wave radar mounted in the vehicle, and informing the driver of the detection of the obstacle. For example, Patent Literature 1 discloses a technique of notifying a user of a result of detection by an obstacle sensor such as a millimeter-wave radar as to the presence or absence of a preceding vehicle, or the like.

According to the technique disclosed in Patent Literature 1, the driver can recognize the presence or absence of the preceding vehicle from the detection result of the obstacle sensor. However, the driver just receives the notification of the detection result of the obstacle sensor and thus cannot instinctively grasp at least how much a detection area by the obstacle sensor covers. It is considered that some drivers have desired to grasp at least how much the detection area by the obstacle sensor covers, in order to feel safe.

Further, there has recently been proposed autonomous-driving, such as traveling while automatically following a preceding vehicle, and traveling while automatically keeping a lane. It is considered that during the autonomous-driving, the driver does not perform driving operation, and because of this, the driver has a particularly stronger desire to grasp at least how much the detection area by the obstacle sensor covers, in order to feel safe.

PRIOR ART LITERATURES

Patent Literature

Patent Literature 1: JP-2013-41444-A

SUMMARY OF INVENTION

It is an object of the present disclosure to provide a vehicular display control device that enables a driver to instinctively grasp at least how much a detection area by an obstacle sensor covers.

According to an aspect of the present disclosure, a vehicular display control device includes: a display control unit for controlling a display device that is mounted in a vehicle and displays an image so as to be superimposed on a surrounding view of the vehicle; and a sensor operation detecting unit for detecting whether an obstacle sensor is in operation, the obstacle sensor being mounted in the vehicle and detecting an obstacle disposed around the vehicle. When the sensor operation detecting unit detects that the obstacle sensor is in operation, the display control unit: transforms a detection target area, which falls in a detection range of the obstacle sensor and expands from the vehicle to a periphery along a road surface, into a detection target image represented from a viewpoint of a driver of the vehicle; and displays a transformed image on the display device so as to be superimposed on the surrounding view of the vehicle.

Since the detection target area is an area that falls in the detection range of the obstacle sensor, it can be said to be an area showing at least how much a detection area covers when the obstacle sensor is in operation. The detection target image represents the detection target area from the viewpoint of the driver of the vehicle. Further, since the detection target area is an area expanding from the vehicle to the surroundings along the road surface, when the detection target image which represents the detection target area from the viewpoint of the driver of the vehicle is displayed so as to be superimposed on the surrounding view of the vehicle, it is seen from the driver as if expanding along the road surface.

When the sensor operation detecting unit detects that the obstacle sensor is in operation, the display control unit displays the detection target image so as to be superimposed on the surrounding view of the vehicle. Hence it is possible to represent at least how much a detection area by the obstacle sensor actually covers, by the expansion of the detection target image along the road surface. When the detection target image is represented along the road surface, a sense of distance can be easily obtained by taking a structure or the like abutting on the road surface as a comparison target, and hence the driver can easily instinctively grasp the sense of distance from the vehicle. Accordingly, the driver can instinctively grasp at least how much the detection area by the obstacle sensor covers.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, an embodiment of the present disclosure is described with reference to the drawings. The following embodiment is an embodiment corresponding to a region where the left-side passage is legislated. Thus, in a region where the right-side passage is legislated, the right and left sides are opposite to those in the following embodiment.

First Embodiment

Schematic Configuration of Operation Support System 100

Figure 1:
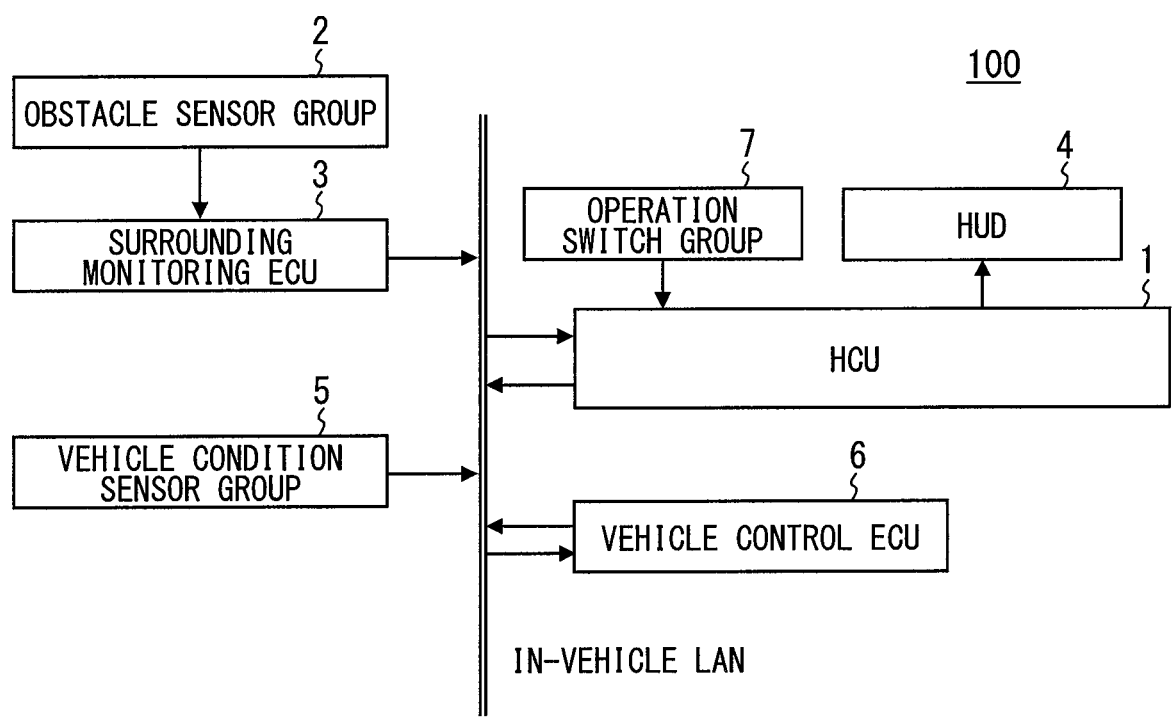
FIG. 1 is a block diagram showing an example of a schematic configuration of an operation support system in a first embodiment.

FIG. 1 is a diagram showing an example of a schematic configuration of an operation support system 100 to which a vehicular display control device according to the present disclosure is applied. As shown in FIG. 1, the operation support system 100 includes a human machine interface control unit (HCU) 1, an obstacle sensor group 2, a surrounding monitoring ECU 3, a head-up display (HUD) 4, a vehicle condition sensor group 5, a vehicle control ECU 6, and an operation switch group 7. For example, the HCU 1 is connected with the surrounding monitoring ECU 3, the vehicle condition sensor group 5, and the vehicle control ECU 6 via an in-vehicle LAN. A vehicle having the operation support system 100 mounted therein is referred to as a subject vehicle.

The obstacle sensor group 2 is a variety of obstacle sensors mounted in the subject vehicle and configured to detect an obstacle present in surroundings of the subject vehicle. The obstacle sensor group 2 is an obstacle sensor such as a millimeter-wave radar, a laser radar, a sonar, or a camera.

Figure 2:
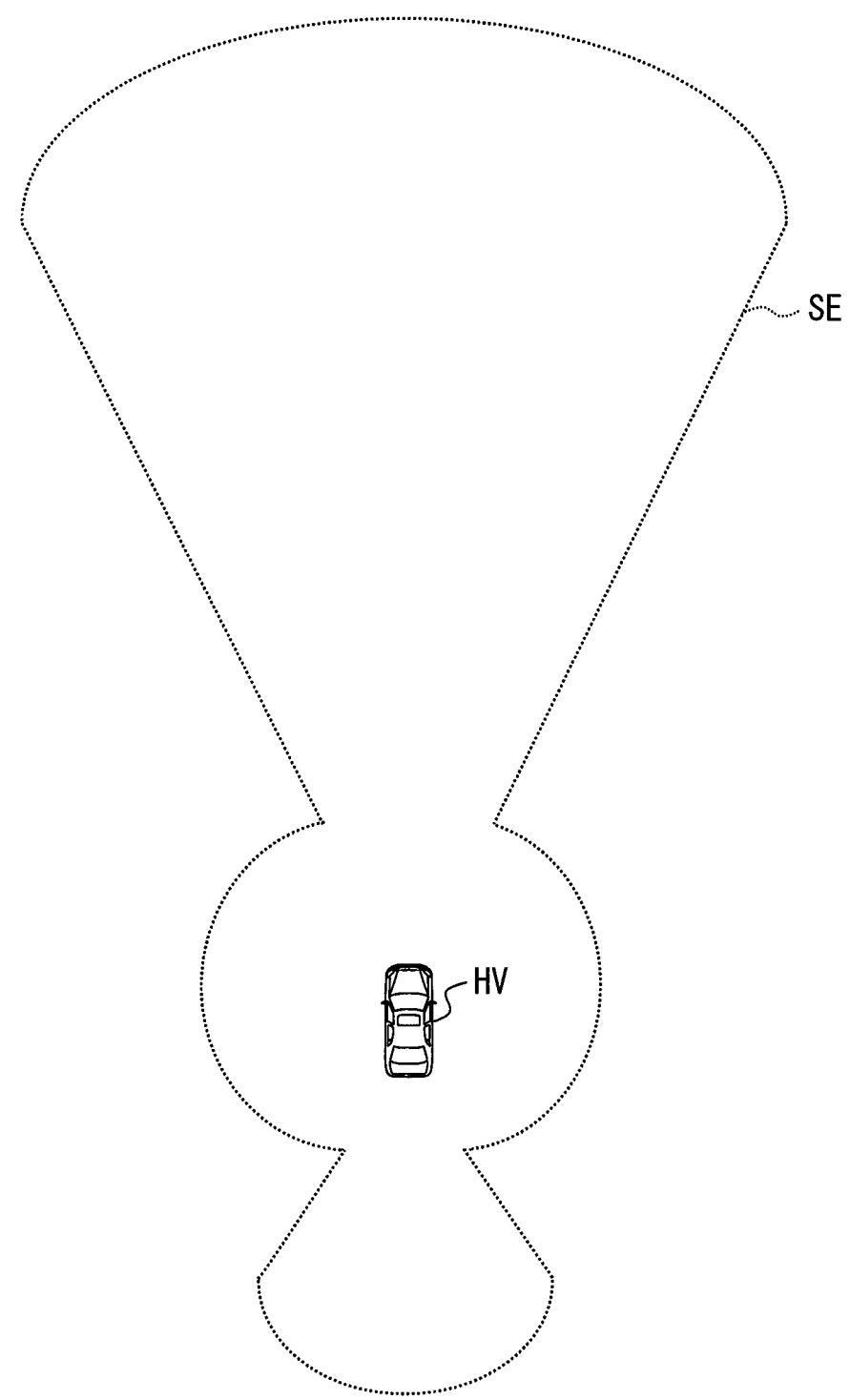
FIG. 2 is a schematic view showing an example of a detection range of an obstacle sensor group.

Herein, a detection range of the obstacle sensor group 2 is described using FIG. 2. FIG. 2 is a view showing an example of the detection range of the obstacle sensor group 2. Symbol HV denotes the subject vehicle, and symbol SE denotes the detection range of the obstacle sensor group 2. This also applies to the different drawings hereinafter. The obstacle sensor group 2 is made up, for example, by combination of a plurality of sensors having different detection ranges, so as to have a detection range in all directions of the surroundings of the subject vehicle, as shown in FIG. 2.

The surrounding monitoring ECU 3 controls operation of the obstacle sensor group 2. Further, the surrounding monitoring ECU 3 detects an obstacle present in the surroundings of the subject vehicle, and detects a relative position or a relative speed of the obstacle with respect to the subject vehicle, on the basis of signals from the obstacle sensor group 2. The surrounding monitoring ECU 3 successively outputs each detected relative position or relative speed to the HCU 1.

For example, when the obstacle sensor group 2 is the millimeter-wave radar, the laser radar, or the sonar, the obstacle is detected by reception of reflected waves against exploration waves. An orientation of the obstacle with respect to the subject vehicle is detected from a direction of transmission of the exploration waves from which the reflected waves are obtained. A distance from the subject vehicle to the obstacle is detected from the time from transmission of the exploration waves to reception of the reflected waves. When the obstacle sensor group 2 is the radar, a phase monopulse radar may be used to detect the relative position with respect to the subject vehicle. A known method may be used to detect the relative speed based on the Doppler shift of the exploration waves and the reflected waves.

When the obstacle sensor group 2 is the camera, the obstacle is detected by use of a known image recognition technique. Further, when an installed position and an orientation of an optical axis of the camera with respect to the subject vehicle are determined, an orientation and a distance (i.e., relative position) with respect to the subject vehicle can be detected from the position in a captured image. Hence the relative position of the obstacle with respect to the subject vehicle is detected from the installed position and the orientation of the optical axis of the camera with respect to the subject vehicle and from the position of the obstacle in the captured image. When the obstacle sensor group 2 is the stereo camera, the distance of the obstacle with respect to the subject vehicle may be detected based on a parallax quantity of a pair of cameras. The relative speed may be detected based on a change in the size of the obstacle in successively captured images.

The HUD 4 is a head-up display device for projecting a display image formed on a TFT liquid crystal panel onto a windshield of the subject vehicle to display a virtual image of the display image in a viewable manner from the inside of the subject vehicle. This virtual image displayed by the HUD 4 is superimposed on the front view of the vehicle and viewed by the driver. That is, the HUD 4 displays the image so as to be superimposed on the view seen from the driver of the subject vehicle through the windshield of the subject vehicle. Hereinafter, the display image projected onto the windshield by the HUD 4 is referred to as an HUD image. In addition, the configuration of the HUD 4 is not limited to that the TFT liquid crystal panel is used as the display element, but a laser element may be used.

The projective plane on the windshield where the HUD image is to be projected is set so as to be located below a driving sight area which is ensured when the driver performs driving operation, in order to decrease a visual line movement quantity of the driver and reduce a focus adjustment load.

The vehicle condition sensor group 5 is a variety of sensors for detecting the condition of the subject vehicle and includes, for example, a vehicle speed sensor, an acceleration sensor, a yaw rate sensor, a receiver used in a satellite positioning system, a rudder angle sensor, and the like. The vehicle speed sensor detects a subject vehicle speed, the acceleration sensor detects an acceleration that acts on the subject vehicle, and the yaw rate sensor detects an angular speed (i.e., a yaw rate) around a vertical axis of the subject vehicle. The receiver used in the satellite positioning system receives radio waves from a positioning satellite to acquire data indicating a current position. The rudder angle sensor detects a steering angle of the subject vehicle.

Based on the information inputted from the surrounding monitoring ECU 3 and the vehicle condition sensor group 5, the vehicle control ECU 6 cause an EPS_ECU (not shown) to automatically perform steering control or cause an engine ECU or a brake ECU (not shown) to automatically perform acceleration and deceleration control. The EPS_ECU activates an EPS actuator to control the steering angle. The engine ECU activates a throttle actuator to control acceleration. The brake ECU activates a brake actuator to control deceleration.

Examples of the automatic acceleration and deceleration control include following traveling control, which is known automatic acceleration and deceleration control performed such that a vehicle-to-vehicle distance between the subject vehicle and a preceding vehicle, among obstacles detected by the surrounding monitoring ECU 3, becomes an aimed vehicle-to-vehicle distance. Examples of the automatic steering control include lane keeping control which is automatic steering control performed so as to keep a traveling lane. When the lane keeping control is to be performed, the obstacle sensor group 2 is configured to include a camera for capturing an image of the road surface in front of the subject vehicle. Travelling of the subject vehicle performing the following traveling control or the lane keeping control is hereinafter referred to as autonomous-driving. The autonomous-driving can be reworded as semi-autonomous-driving.

The operation switch group 7 is a mechanical switch and the like provided around a steering, for example. The operation switch group 7 is operated by the driver for switching between the start and end of the autonomous-driving or performing a variety of settings.

The HCU 1 is configured mainly as a microcomputer, and made up of known memories such as a CPU, a ROM, a RAM, and an EEPROM, an I/O, and a bus for connecting those components. Based on a variety of information inputted from the surrounding monitoring ECU 3, the vehicle condition sensor group 5, the vehicle control ECU 6, and the operation switch group 7, the HCU 1 executes a variety of processing such as display control-related processing for generating a display image to be projected by use of the HUD 4 and projecting the generated image onto the HUD 4. The HCU 1 is equivalent to a vehicular display control device.

A part or the whole of functions that are executed by the HCU 1 may be hardware made up of one or more ICs, and the like.

Detailed Configuration of HCU 1

Figure 3:
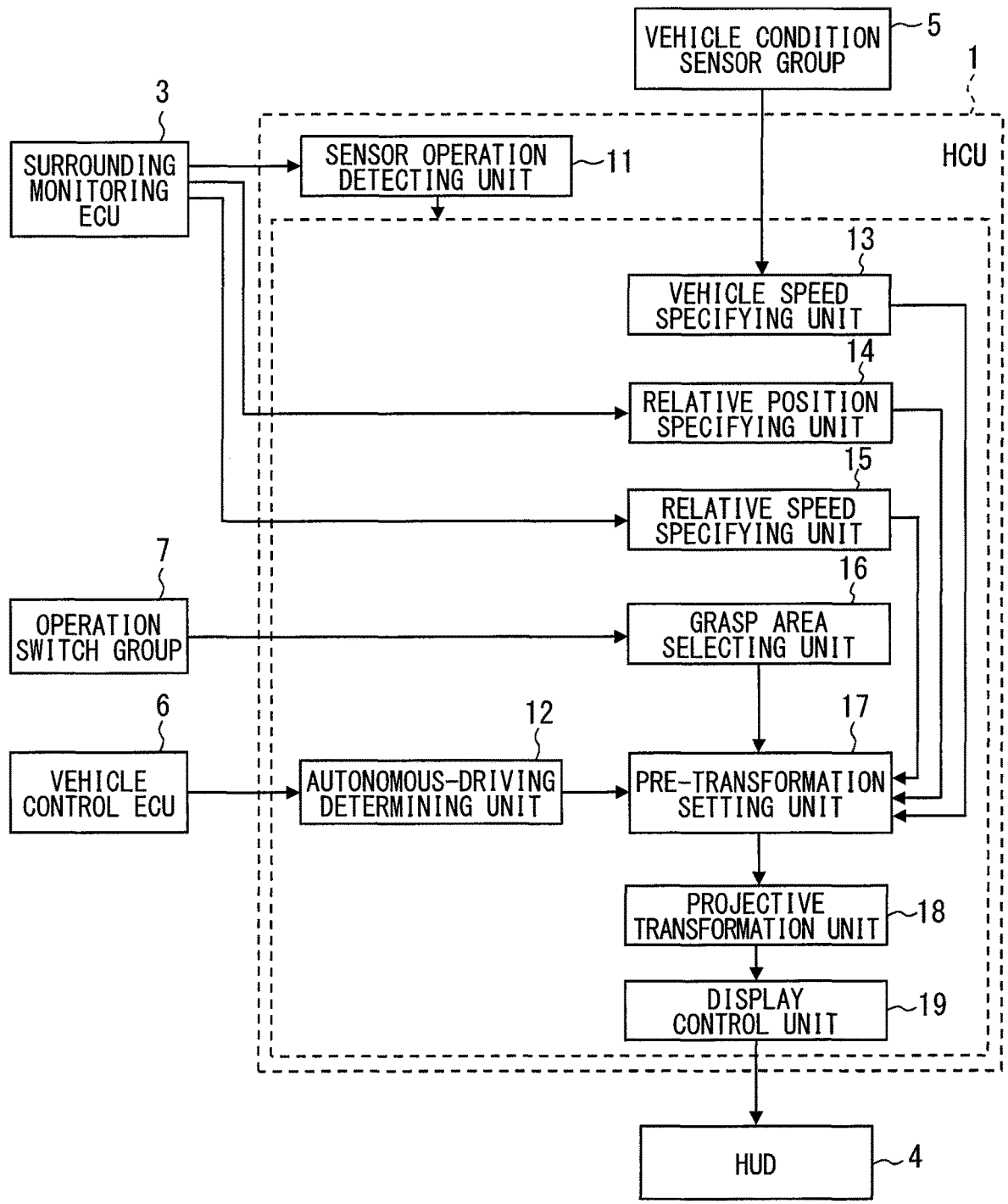
FIG. 3 is a block diagram showing an example of a schematic configuration of an HCU in the first embodiment.

As shown in FIG. 3, the HCU 1 includes a sensor operation detecting unit 11, a autonomous-driving determining unit 12, a vehicle speed specifying unit 13, a relative position specifying unit 14, a relative speed specifying unit 15, a detection target area selecting unit 16, a pre-transformation setting unit 17, a projective transformation unit 18, and a display control unit 19.

When the surrounding monitoring ECU 3 makes the obstacle sensor group 2 operated, the sensor operation detecting unit 11 detects that the obstacle sensor group 2 is in operation, from a signal of the surrounding monitoring ECU 3.

When the vehicle control ECU 6 makes the following traveling control or the lane keeping control performed, the autonomous-driving determining unit 12 determines that the subject vehicle is in autonomous-driving, from a signal of the vehicle control ECU 6. On the other hand, when the vehicle control ECU 6 makes neither the following traveling control nor the lane keeping control performed, the autonomous-driving determining unit 12 determines that the subject vehicle is in non-autonomous-driving.

The autonomous-driving determining unit 12 may be configured to determine whether the subject vehicle is in autonomous-driving or non-autonomous-driving, based on the on and off of the switch for switching between the start and end of the autonomous-driving, included in the operation switch group 7.

The vehicle speed specifying unit 13 specifies the subject vehicle speed from a signal of the vehicle speed sensor included in the vehicle condition sensor group 5. The relative position specifying unit 14 specifies the relative position of the obstacle with respect to the subject vehicle, which is detected by the surrounding monitoring ECU 3, as the relative position of the obstacle with respect to the subject vehicle. The relative speed specifying unit 15 specifies the relative position of the obstacle with respect to the subject vehicle, which is detected by the surrounding monitoring ECU 3, as the relative position of the obstacle with respect to the subject vehicle.

The detection target area selecting unit 16 selects a range of a personal safety space (hereinafter, a detection target area) based on input operation of the driver into the operation switch group 7. The detection target area is an area which the driver desires to grasp the detection range of the obstacle sensor group 2.

Figure 4:
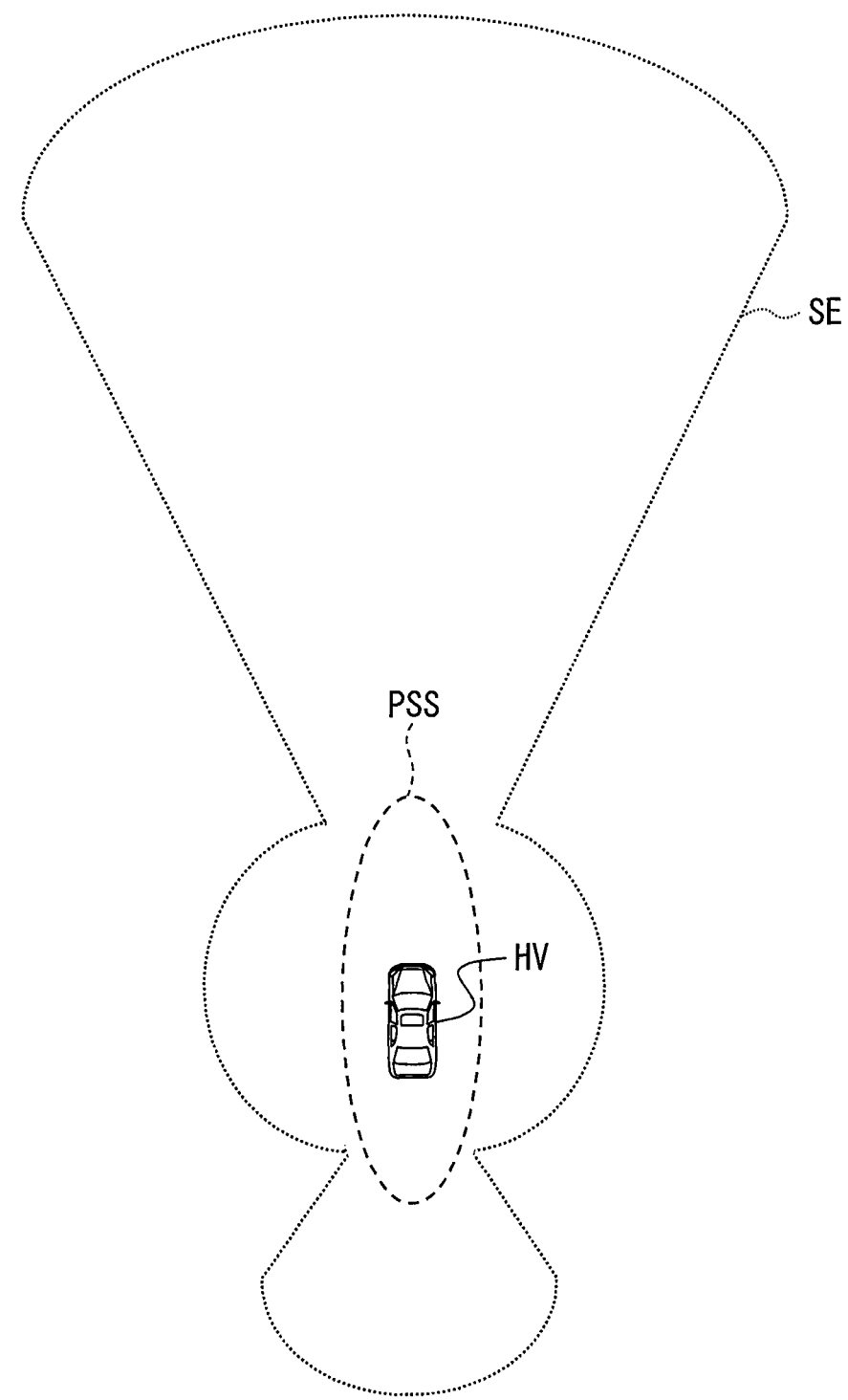
FIG. 4 is a schematic view illustrating a detection target area.

First, the detection target area is described using FIG. 4. The detection target area (see PSS of FIG. 4) is not the detection range (SE of FIG. 4) itself of the obstacle sensor group 2, but an area narrower than the detection range of the obstacle sensor group 2. The detection target area is not intended to show the detection range itself of the obstacle sensor group 2, but to allow the driver to grasp at least how much the detection area by the obstacle sensor group 2 covers. Hence the driver may freely select the detection target area so long as the detection target area falls in the detection range of the obstacle sensor group 2.

Further, the detection target area is a plane area expanding from the subject vehicle to the surroundings. In the present embodiment, as an example, the detection target area is a plane area horizontally expanding from the subject vehicle when the subject vehicle is assumed to be located on the horizontal plane. The shape of this plane area is assumed to be such a shape as being longer in a longitudinal direction of the subject vehicle than in a width direction of the subject vehicle, and expanding along the lane.

The detection target area is expressed as a plane with a fixed height value on a world coordinate system taking a longitudinal direction seen from the subject vehicle as a Y-axis, a lateral direction as an X-axis, and a height direction as a Z-axis. A value of the Z-axis of the detection target area is assumed to be set to a value to such a degree that, when the height of the road surface is set to 0, the value is not too distant from the road surface. As an example, the value of the Z-axis of the detection target area may be about 1 m or smaller.

Figure 5:
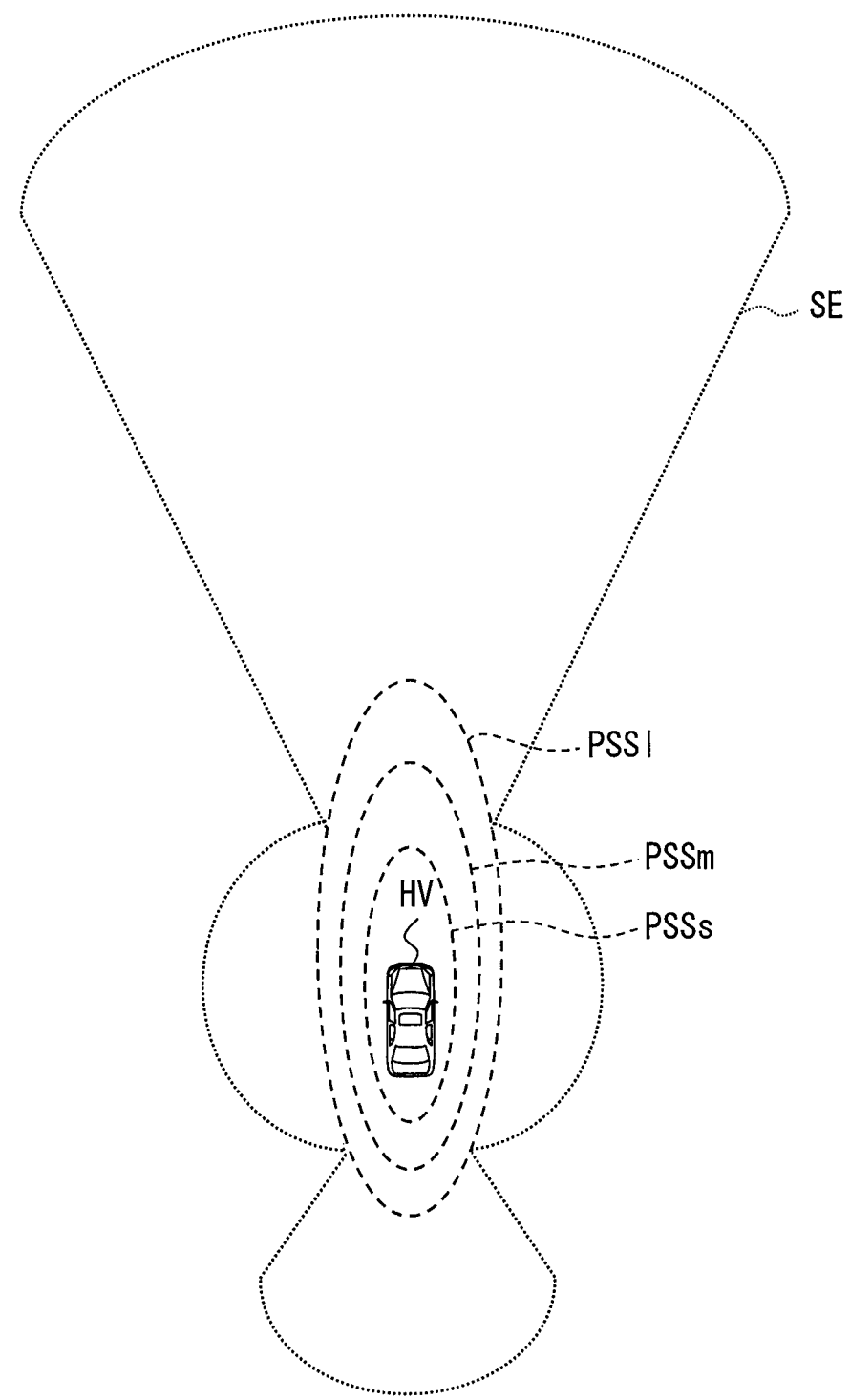
FIG. 5 is a schematic view illustrating selection of the detection target area.

Subsequently, selection of the detection target area is described using FIG. 5. Herein, a description is given taking as an example the case of being able to select three kinds of detection target areas, large, middle and small areas. In FIG. 5, symbol PSSl denotes a detection target area with a "large" range, symbol PSSm denotes a detection target area with a "middle" range, and symbol PSSs denotes a detection target area with a "small" range.

The driver operates the operation switch group 7 to select a favorite range from "large", "middle", and "small". The detection target area selecting unit 16 selects the detection target area with the range selected by the input operation performed by the driver on the operation switch group 7 as a default detection target area to be used in processing thereafter. The selected detection target area is stored, for example, into the nonvolatile memory of the HCU 1, and remains to be held until a new selection is made. The detection target area selecting unit 16 is equivalent to a selection unit.

The pre-transformation setting unit 17, the projective transformation unit 18, and the display control unit 19 are detailed in the following description of the display control-related processing.

Display Control-Related Processing

Figure 6:
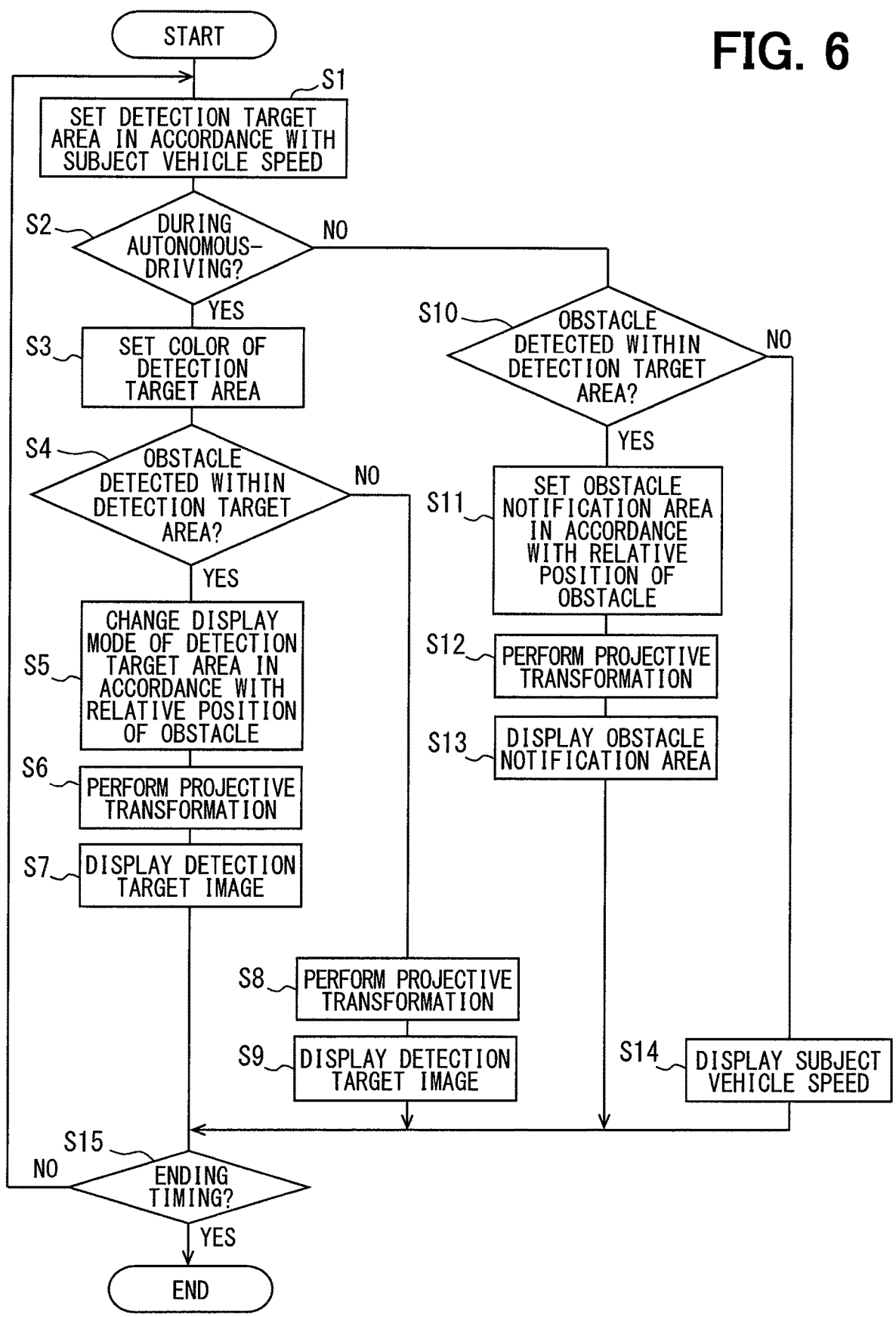
FIG. 6 is a flowchart showing an example of display control-related processing in the HCU.

Herein, the display control-related processing in the HCU 1 is described using a flowchart of FIG. 6. The flowchart of FIG. 6 is started when the sensor operation detecting unit 11 detects that the obstacle sensor group 2 is in operation. The description is herein given assuming that the selection of the detection target area is completed, for the sake of convenience.

First, in Step S1, the pre-transformation setting unit 17 sets the detection target area range in accordance with the subject vehicle speed specified by the vehicle speed specifying unit 13 based on the default detection target area range selected by the detection target area selecting unit 16.

Specifically, the default detection target area is expanded in a range not exceeding the detection range of the obstacle sensor group 2 in accordance with the subject vehicle speed becoming larger than a value as a reference. On the other hand, the default detection target area is narrowed in accordance with the subject vehicle speed becoming smaller than the value as the reference. Therefore, the detection target area is expanded with an increase in the subject vehicle speed, whereas the detection target area is narrowed with a decrease in the subject vehicle speed due to a traffic jam or the like.

In Step S1, the detection target area is not changed from the default until the subject vehicle speed exceeds an upper or lower threshold, and the detection target area may be expanded or narrowed when the subject vehicle speed exceeds this threshold.

In Step S2, when the autonomous-driving determining unit 12 determines that the subject vehicle is in autonomous-driving (YES in S2), the processing proceeds to Step S3. On the other hand, when the autonomous-driving determining unit 12 determines that the subject vehicle is in non-autonomous-driving (NO in S2), the processing proceeds to Step S10.

In Step S3, the pre-transformation setting unit 17 makes a setting for displaying the detection target area, set in Step S1, in blue. As a specific example, the pre-transformation setting unit 17 sets RGB values with respect to the respective coordinates of the detection target area such that a blue color of the detection target area gets lighter from the center toward the edge of the area. That is, the pre-transformation setting unit 17 makes the setting such that the edge is displayed so as to be blurred.

In Step S4, when the relative position of the obstacle with respect to the subject vehicle, which is specified by the relative position specifying unit 14, is within the detection target area range set in Step S1 (YES in S4), the processing proceeds to S5. On the other hand, when the relative position is not within the detection target area range (NO in S4), the processing proceeds to Step S8.

In Step S5, the pre-transformation setting unit 17 makes a setting for changing the display mode of the detection target area in accordance with the relative position of the obstacle with respect to the subject vehicle. First, an obstacle notification area for notifying the presence of the obstacle is set in a boundary area located in the direction in accordance with the relative position of the obstacle, in the detection target area.

Figure 7A:
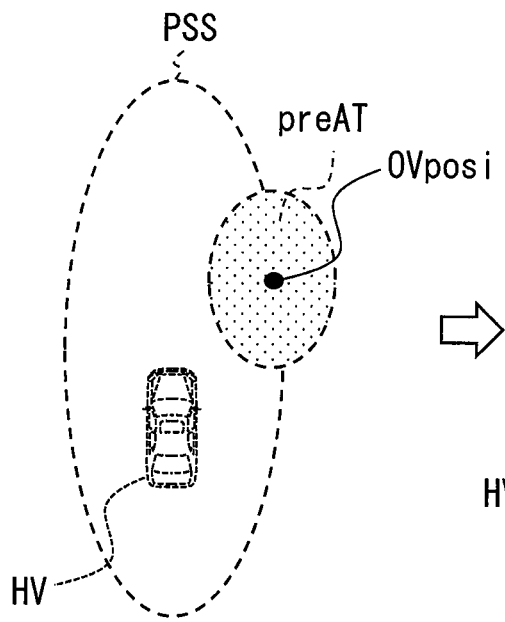
FIGS. 7A and 7B are schematic views illustrating an example of a setting of an obstacle notification area.
Figure 7B:
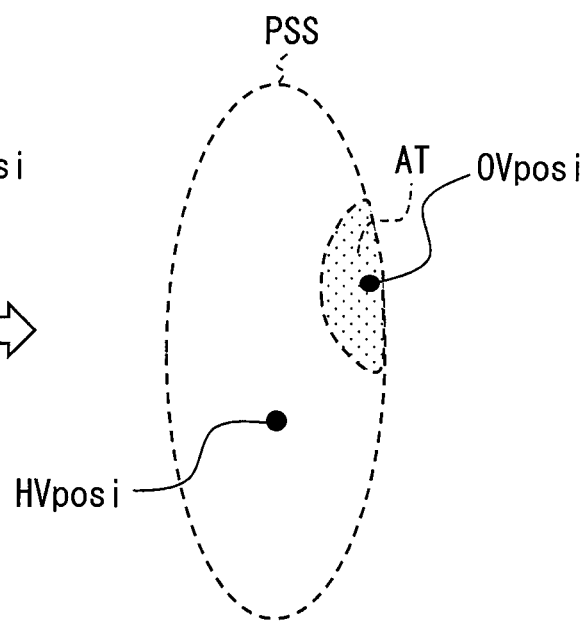

An example of the setting of the obstacle notification area is described using FIGS. 7A and 7B. In FIGS. 7A and 7B, symbol HV denotes the subject vehicle, symbol HVposi denotes the position of the subject vehicle, symbol OVposi denotes the position of the obstacle, symbol PSS denotes the obstacle notification area, symbol preAT denotes a predetermined range with the obstacle position taken at the center, and symbol AT denotes the obstacle notification area.

When the obstacle notification area is to be set, a predetermined range (see preAT of FIGS. 7A and 7B) taking the obstacle position (see OVposi of FIGS. 7A and 7B) at the center is set with respect to the obstacle notification area set in Step S1 (see PSS of FIGS. 7A and 7B). This predetermined range is assumed to be an ellipsoid or circular plane area with the obstacle position taken at the center on the same plane as the detection target area, and be smaller than the detection target area. An area where the predetermined range with the obstacle position taken at the center overlaps with the detection target area is set as the obstacle notification area (see AT of FIGS. 7A and 7B).

As the obstacle position is closer to the subject vehicle, the area where the predetermined range with the obstacle position taken at the center overlaps with the detection target area becomes larger. Therefore, as the relative position of the obstacle with respect to the subject vehicle is closer, the range of the obstacle notification area is set to become larger.

Further, when the obstacle notification area is to be set, the RGB values are set with respect to the respective coordinates of the obstacle notification area such that a yellow color of the obstacle notification area gets lighter from the obstacle position toward the edge of the area. That is, the RGB values are set such that the edge is displayed so as to be blurred.

Moreover, the pre-transformation setting unit 17 makes a setting for displaying, in the obstacle notification area, arc-like ripples expanding from a direction in which the obstacle is located. As a specific example, the RGB values are set such that the color of the arc-like ripples expanding from the obstacle located direction is a prominent color (e.g., orange) in the obstacle notification area on the respective coordinates of the obstacle notification area.

The number of the arc-like ripples is four as an example in the first embodiment. When the setting for displaying the arc-like ripples is to be made, the setting is made such that intervals among the arc-like ripples (i.e., intervals among the ripples) are made wider along an expanding direction of the ripples.

Figure 8A:
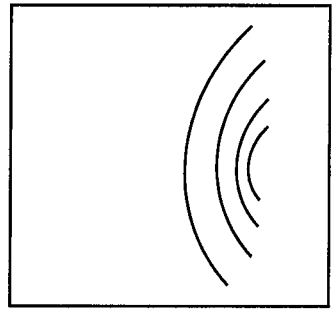
FIGS. 8A and 8B are schematic views illustrating a setting of intervals among arc-like ripples.
Figure 8B:
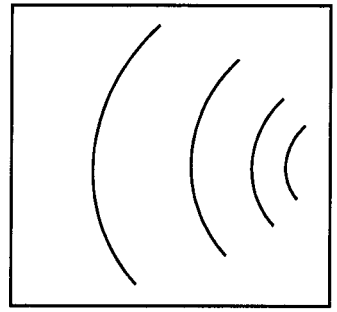

Further, when the setting for displaying the arc-like ripples is to be made, the setting is made such that intervals among the arc-like ripples are made narrower with an increase in the relative speed of the obstacle with respect to the subject vehicle, as the example is shown in FIGS. 8A and 8B. FIGS. 8A and 8B show the comparison between the intervals among the ripples in the case where the relative speed of the obstacle is larger and the intervals among the ripples in the case where the relative speed of the obstacle is smaller.

Setting the intervals among the ripples so as to become narrower with an increase in the relative speed of the obstacle with respect to the subject vehicle enables the driver to grasp the relative speed of the obstacle with respect to the subject vehicle, based on the narrowed state of each of the intervals among the arc-like ripples.

Further, when the setting for displaying the arc-like ripples is to be made, patterns with different numbers of ripples are separately set to display the arc-like ripples so as to be seen as if the arc-like ripples move in the expanding direction thereof. That is, obstacle notification areas and detection target areas including the arc-like ripples are set in number corresponding to patterns with different numbers of ripples.

Figure 9:
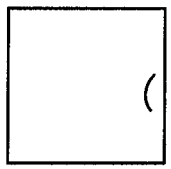
FIG. 9 is a schematic view illustrating a setting for displaying the arc-like ripples so as to be seen as if the arc-like ripples move in an expanding direction thereof.
Figure 9:
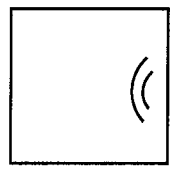
Figure 9:
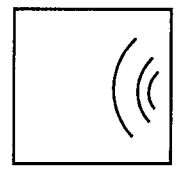
Figure 9:
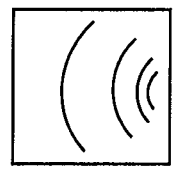
Figure 9:
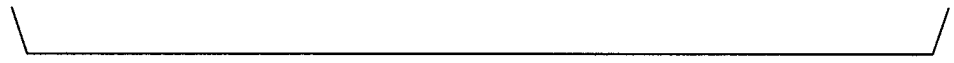

Herein, the setting for the patterns with different numbers of ripples is described using FIG. 9. Since the number of ripples in the example of the first embodiment is four, four patterns with the numbers of ripples being "one", "two", "three", and "four" are set as the patterns with different numbers of ripples, as shown with W1 to W4.

In Step S6, an area ahead of the subject vehicle is cut out of the detection target area including the obstacle notification area set by the pre-transformation setting unit 17 in Step S5, and the projective transformation unit 18 transforms the cut-out detection target area into an image seen from the driver of the subject vehicle (hereinafter, a detection target image) by applying the known projective transformation. The cut-out detection target area can be reworded as a range corresponding to a projective plane on the windshield where the HUD image is projected. In addition, the position of the viewpoint of the driver which is used in the case of performing the projective transformation may be a previously stored fixed position or may be a position detected by an occupant camera or the like.

Figure 10A:
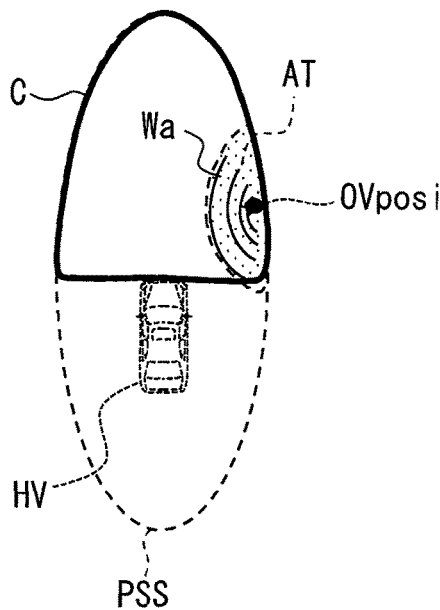
FIGS. 10A and 10B are schematic views illustrating a range that is cut out from the detection target area for projective transformation.
Figure 10B:
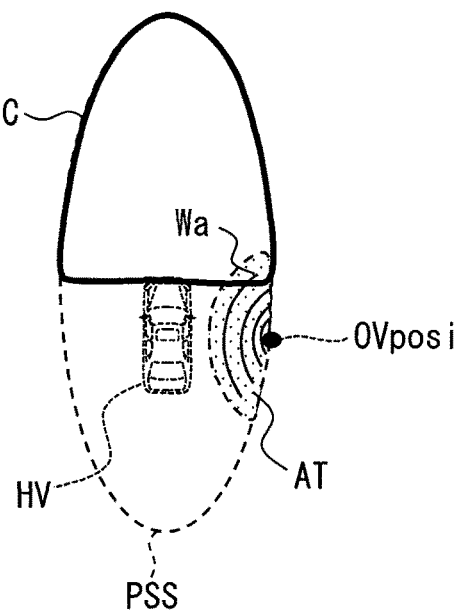

Herein, an example of the detection target area cut out in Step S6 is described using FIGS. 10A and 10B. Of FIGS. 10A and 10B, FIG. 10A shows a case where the obstacle is located diagonally on the front right of the subject vehicle, and FIG. 10B shows a case where the obstacle is located on the right side of the subject vehicle. In FIGS. 10A and 10B, symbol HV denotes the subject vehicle, symbol OVposi denotes the obstacle position, symbol PSS denotes the obstacle notification area, symbol AT denotes the obstacle notification area, symbol Wa denotes the arc-like ripples, and symbol C denotes the cut-out detection target area.

As shown in FIG. 10A, when the obstacle is located within the cut-out obstacle notification area and when a large part of each of the obstacle notification area and the arc-like ripples is included within the cut-out obstacle notification area, this large part is also cut out. Then, this large part of the obstacle notification area and the arc-like ripples is also subjected to the projective transformation and is included into the detection target image.

In contrast, as shown in FIG. 10B, when the obstacle is not located within the cut-out obstacle notification area and a large part of each of the obstacle notification area and the arc-like ripples is not included within the cut-out obstacle notification area, this large part is not cut out. The obstacle notification area and the arc-like ripples, which are not cut out, are not subjected to the projective transformation and are not included into the detection target image.

Further, the projective transformation of the cut-out detection target area is performed in number corresponding to patterns with different numbers of arc-like ripples.

In Step S7, the display control unit 19 performs processing for providing the transparency to the detection target image obtained by the projective transformation unit 18 performing the projective transformation in Step S6, and transmits the resultant detection target image to the HUD 4. The display control unit 19 then instructs the HUD 4 to display this detection target image. The projective transformation unit 18 and the display control unit 19 are equivalent to a display control unit. The detection target image obtained in Step S6 is projected onto the windshield of the subject vehicle by the HUD 4, and thereby displayed so as to be superimposed translucently on a view seen from the driver of the vehicle. As the processing for providing the transparency, a known technique such as alpha blending may be used.

Further, the display control unit 19 instructs the HUD 4 to repeatedly display the obstacle notification areas and the detection target images including the arc-like ripples, which are subjected to the projective transformation in number corresponding to patterns with different numbers of ripples, in ascending order of the number of ripples in the image. As a specific example, the HUD 4 is instructed to repeatedly display the images in the order of patterns W1, W2, W3, and W4 shown in FIGS. 8A and 8B. According to this, in the detection target image projected onto the windshield, the arc-like ripples can be displayed such that the number thereof sequentially increases in the ripple expanding direction. Hence the arc-like ripples are seen as the arc-like ripples move in the expanding direction thereof. This facilitates the driver to grasp an approaching direction of the obstacle.

Further, the display control unit 19 superimposes an image showing the subject vehicle speed on the detection target image and transmits the resultant image to the HUD 4, to project the subject vehicle speed onto the windshield along with the detection target image. In addition, this also applies to Steps S9, S13, and S14 hereinafter. As for the subject vehicle speed, a value specified by the vehicle speed specifying unit 13 is used.

Figure 11A:
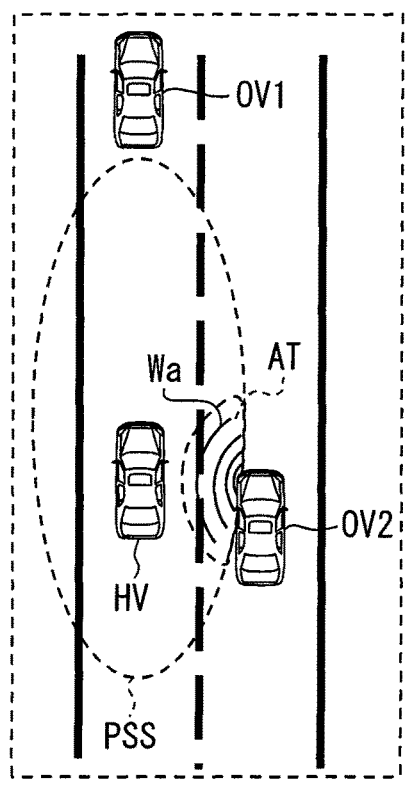
FIGS. 11A and 11B are schematic views illustrating a display mode of a detection target image projected onto a windshield.
Figure 11B:
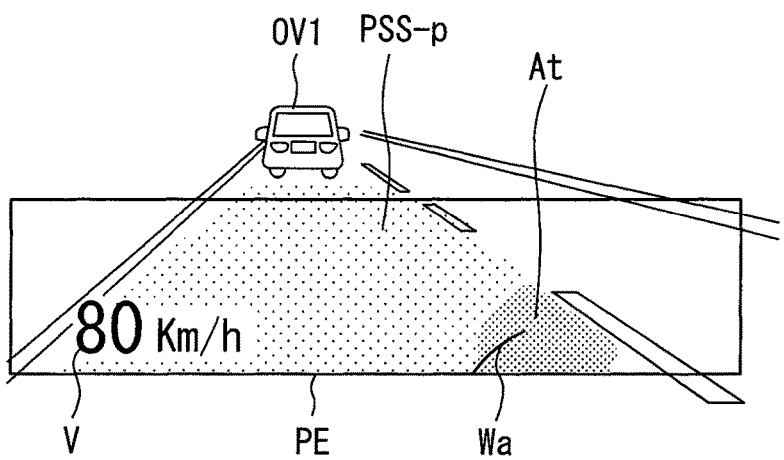
Figure 12A:
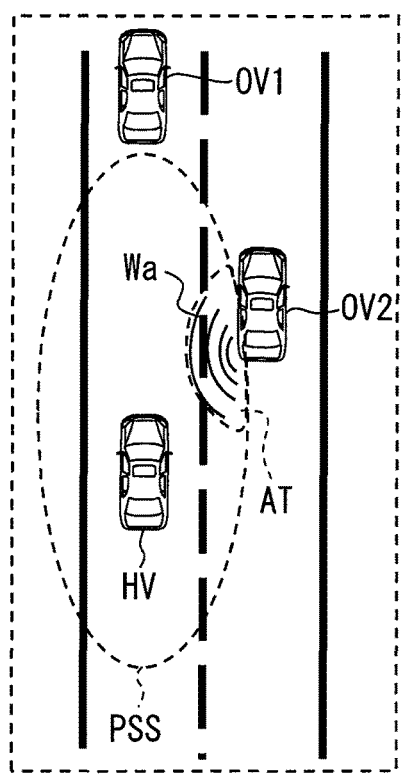
FIGS. 12A and 12B are schematic views illustrating a display mode of a detection target image projected onto the windshield.
Figure 12B:
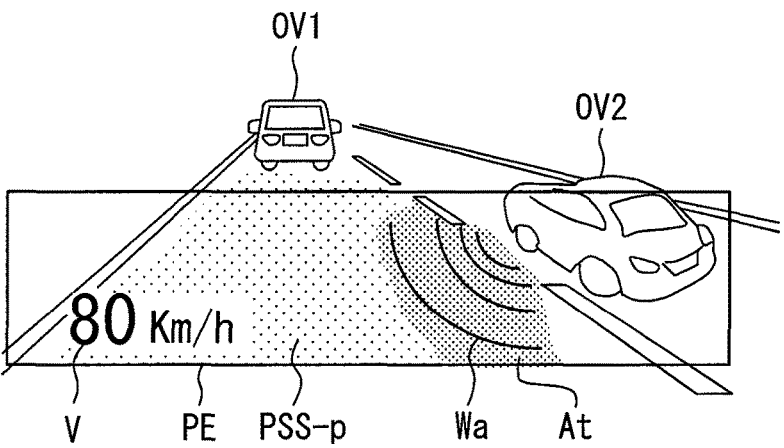

Herein, the display mode of the detection target image projected onto the windshield by the HUD 4 in the processing of Step S7 is described using FIGS. 11A, 11B, 12A, and 12B. FIGS. 11A, 11B, 12A, and 12B are schematic views each showing the front view seen from the driver of the subject vehicle. FIGS. 11A and 11B show the case where an overtaking car is located diagonally on the front right of the subject vehicle. FIGS. 12A and 12B show the case where the overtaking car is located on the right side of the subject vehicle.

In FIGS. 11A, 11B, 12A, and 12B, a situation of the subject vehicle seen from the zenith direction is shown in a place surrounded by a dotted line for reference. In FIGS. 11A, 11B, 12A, and 12B, symbol OV1 denotes the preceding vehicle, symbol OV2 denotes the overtaking vehicle that passes the subject vehicle, symbol PSS denotes the detection target area, symbol V denotes the subject vehicle speed, symbol PE denotes the projective plane for projecting the detection target area, symbol PSS-p denotes the detection target image obtained by performing the projective transformation on the detection target area, symbol At denotes the obstacle notification area, and symbol Wa denotes the arc-like ripples. This also applies to the same symbols in FIGS. 13A, 13B, 14A, and 14B.

Since the detection target area is a plane area horizontally expanding from the subject vehicle in the case of the subject vehicle being located on the horizontal plane, when the subject vehicle is located on the road surface, the detection target area is the plane area expanding along the road surface. Hence the detection target image, which is obtained by performing the detection target area corresponding to the plane area expanding along the road surface, is seen as if the detection target image expands along the road surface, as shown in FIGS. 11A, 118, 12A, and 12B.

When the obstacle is located within the detection target area and even a part of the obstacle notification area is included in the detection target image, as shown in FIGS. 11A, 118, 12A, and 12B, an area corresponding to the obstacle notification area in the detection target image is displayed in yellow, and the arc-like ripples expanding from an approaching direction the obstacle are displayed in the area.

As shown in FIGS. 11A and 118, even when the relative position of the overtaking vehicle as the obstacle with respect to the subject vehicle is the right side of the subject vehicle and this overtaking vehicle is not included in the front view, a part of each of the obstacle notification area and the arc-like ripples is displayed so as to be superimposed on the front view. Further, the arc-like ripples are displayed so as to be seen as if the arc-like ripples expand from the obstacle located direction. This display makes the driver aware that the overtaking vehicle is getting closer from the right side of the subject vehicle even when the overtaking vehicle is not included in the front view.

Further, as shown in FIGS. 12A and 12B, when the relative position of the overtaking vehicle as the obstacle with respect to the subject vehicle is diagonally on the front right of the subject vehicle and this overtaking vehicle is in the front sight of the driver, a large part of each of the obstacle notification area and the arc-like ripples is displayed so as to be superimposed on the front view. Further, the arc-like ripples are displayed so as to be seen as if the arc-like ripples expand from the obstacle located direction. This display enables the driver to confirm that the obstacle sensor group 2 detects the overtaking vehicle included in the front view. After Step S7, the processing proceeds to Step S15.

Returning to FIG. 6, in Step S8 being a case where the relative position of the obstacle with respect to the subject vehicle, which is specified by the relative position specifying unit 14, is not within the detection target area range set in Step S1, the projective transformation unit 18 performs the projective transform on the detection target area set by the pre-transformation setting unit 17 in Step S3 into a projective image, in a similar manner as in Step S6.

In Step S9, the display control unit 19 transmits to the HUD 4 the projective image obtained by the projective transformation unit 18 performing the projective transformation in Step S8, and instructs the HUD 4 to display this projective image. Since the foregoing obstacle notification area and arc-like ripples are not set in the detection target area that is subjected to the projective transformation in Step S8, the detection target image projected onto the windshield by the HUD 4 is a detection target image without the foregoing obstacle notification area and arc-like ripples.

Figure 13A:
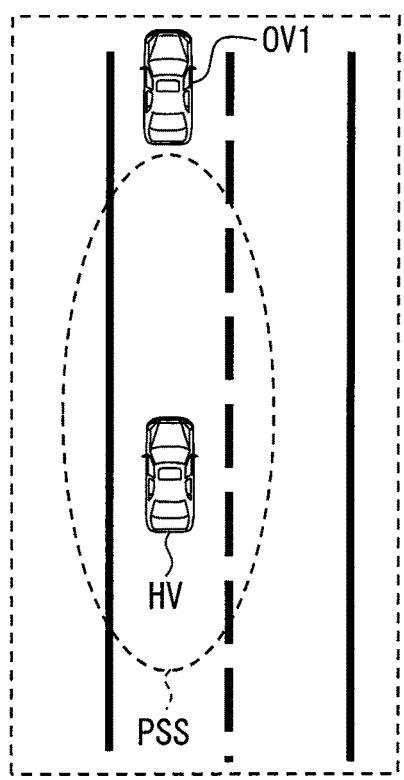
FIGS. 13A and 13B are schematic views illustrating a display mode of a detection target image projected onto the windshield.
Figure 13B:
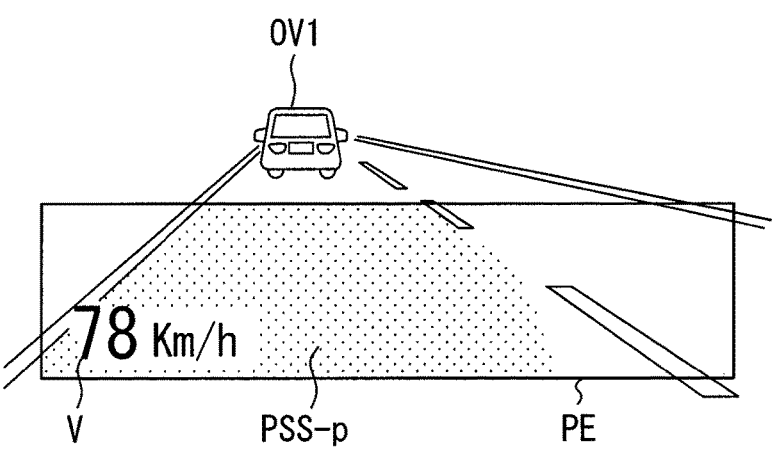

Herein, the display mode of the detection target image projected onto the windshield by the HUD 4 in the processing of Step S9 is described using FIGS. 13A and 13B. In the example shown in FIGS. 13A and 13B, since no obstacle is detected, a detection target image without a change in the color indicating the obstacle notification area or the arc-like ripples is displayed, as shown in FIGS. 13A and 13B.

Returning to FIG. 6, in Step S10 being a case where the subject vehicle is determined to be in non-autonomous-driving, when the relative position of the obstacle with respect to the subject vehicle, which is specified by the relative position specifying unit 14, is within the detection target area range set in Step S1 (YES in S10), the processing proceeds to Step S11. On the other hand, when the relative position is not within the detection target area range (NO in S10), the processing proceeds to Step S14.

In Step S11, the pre-transformation setting unit 17 sets the obstacle notification area for notifying the presence of the obstacle in accordance with the relative position of the obstacle with respect to the subject vehicle, in a similar manner as in Step S5. Also in Step S11, the obstacle notification area is set so as to be displayed in yellow.

In Step S12, by applying the known projective transformation technique, the projective transformation unit 18 transforms the obstacle notification area set by the pre-transformation setting unit 17 in Step S11 to an image seen from the driver of the subject vehicle. Hereinafter, the image obtained by performing the projective transformation on the obstacle notification area is referred to as an obstacle notification image. In Step S12, the detection target area may be subjected to the projective transformation in conjunction with the obstacle notification area. However, in the preceding step, the detection target area is not set to be displayed so as to be colored, and hence the detection target area other than an area corresponding to the obstacle notification area does not become a colored image. That is, the detection target area other than the area corresponding to the obstacle notification area becomes an image not to be displayed.

In Step S13, the display control unit 19 transmits the obstacle notification image obtained by the projective transformation unit 18 performing the projective transformation in Step S12 is transmitted to the HUD 4, and instructs the HUD 4 to display this obstacle notification image. The arc-like ripples in the obstacle notification image are instructed to be displayed in a similar manner as described in Step S7.

Figure 14A:
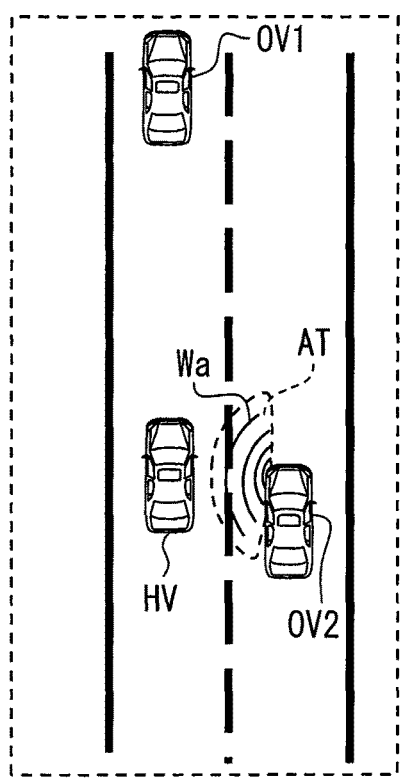
FIGS. 14A and 14B are schematic views illustrating a display mode of an obstacle notification image projected onto the windshield.
Figure 14B:
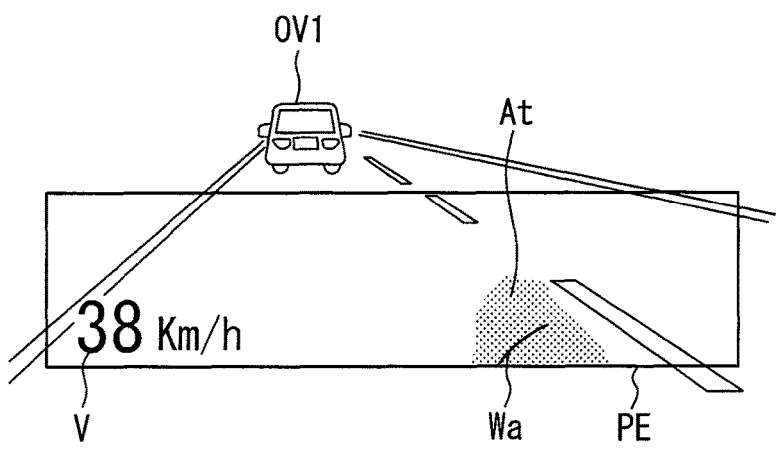

Herein the display mode of the obstacle notification image projected onto the windshield by the HUD 4 in the processing of Step S13 is described using FIGS. 14A and 14B. In the example of FIGS. 14A and 14B, the obstacle is located within the obstacle notification area, and a part of the obstacle notification area is located ahead of the subject vehicle. Hence, while the obstacle notification image represented in yellow is displayed, arc-like ripples expanding from the approaching direction of the obstacle is displayed in the area of the obstacle notification image, as shown in FIGS. 14A and 14B. In addition, the detection target area other than the area corresponding to the obstacle notification area is not displayed.

In Step S14, the display control unit 19 transmits an image showing the subject vehicle speed to the HUD 4, to project the subject vehicle speed onto the windshield. That is, when no obstacle is present during non-autonomous-driving, neither the detection target image nor the obstacle notification image is projected onto the windshield. After Step S14, the processing proceeds to Step S15.

In Step S15, when it is the timing for ending the display control-related processing (YES in S15), the display control-related processing is completed. On the other hand, when it is not the timing for ending the display control-related processing (NO in S15), the processing returns to Step S1 for repetition of the processing. Examples of the timing for ending the display control-related processing include a case where the sensor operation detecting unit 11 stops detecting that the obstacle sensor group 2 is in operation.

Although not detailed in the first embodiment, when the relative position of the obstacle with respect to the subject vehicle, which is specified by the relative position specifying unit 14, is within the detection target area range set in Step S1 and behind the subject vehicle, the HCU 1 may generate an icon image for informing the driver that the obstacle is located behind the subject vehicle. In this case, the generated icon image is transmitted to the HUD 4, to be displayed so as to be superimposed on the detection target image and the obstacle notification image.

Summary of First Embodiment

The detection target image is an image obtained by performing the projective transformation on the detection target area, which falls in the range the obstacle sensor group 2 takes as the detection target, into an image seen from the driver of the vehicle. Hence it is possible to represent, from the viewpoint of the driver, at least how much the detection area by the obstacle sensor group 2 covers. Further, the detection target area is the plane area expanding along the road surface. Thus, as described above, when the detection target image obtained by performing the projective transformation on the detection target area is displayed so as to be superimposed on the view seen from the driver of the vehicle through the windshield of the vehicle, the image is seen by the driver as if the image expands along the road surface.

In the first embodiment, this detection target image is displayed when the obstacle sensor group 2 is detected to be in operation. Hence it is possible to represent at least how much the detection area by the obstacle sensor group 2 actually covers, by the expansion of the detection target image along the road surface. When the detection target image is represented along the road surface, a sense of distance can be easily obtained by taking a structure or the like abutting on the road surface as a comparison target, and hence the driver can easily instinctively grasp the sense of distance from the subject vehicle. Accordingly, the driver can instinctively grasp at least how much the detection area by the obstacle sensor group 2 actually covers.

Further, it is considered that during the autonomous-driving, as compared with the non-autonomous-driving, the driver does not perform driving operation, and because of this, the driver has a particularly stronger desire to grasp at least how much the detection area by the obstacle sensor group 2 covers, in order to feel safe. According to the first embodiment, the foregoing detection target image is not displayed when the subject vehicle is in non-autonomous-driving, whereas the foregoing detection target image is displayed when the subject vehicle is in autonomous-driving. Hence it is possible to display the detection target image in a situation where the detection target image is considered to be particularly required for the driver.

Besides, according to the configuration of the first embodiment, the detection target area is expanded in accordance with an increase in the subject vehicle speed. It is considered that as the subject vehicle speed is higher, the driver desires to grasp the situation in front in the traveling direction earlier. According to the above configuration, the detection target area can be expanded in the traveling direction of the subject vehicle in accordance with an increase in the subject vehicle speed, and hence the above desire can be satisfied.

Moreover, according to the configuration of the first embodiment, the detection target area is narrowed in accordance with a decrease in the subject vehicle speed. Hence it is possible to narrow the detection target area during a traffic jam. It is considered that during the traffic jam, a preceding vehicle or an alongside vehicle as the obstacle is always located in the vicinity of the subject vehicle. However, narrowing the detection target area during the traffic jam can facilitate exclusion of the preceding vehicle and the alongside vehicle located in the vicinity from the objects to notify as the obstacles. As a result, it is possible to prevent the display of the image showing the obstacle notification area concerning the preceding vehicle and the alongside vehicle located in the vicinity during the traffic jam, thereby reducing the inconvenience.

First Modification

A configuration (hereinafter, a first modification) may be considered that a time to collision (TTC) which is the time until the subject vehicle and the obstacle are estimated to bump into each other is calculated, and when the TTC is below a set value, warning is displayed and a warning sound is outputted. Hereinafter, the first modification is described using the drawings. It is to be noted that in descriptions of the first modification and thereafter, a member having the same function as that of the member shown in the drawings used for the above description of the embodiment is provided with the same numeral, and a description thereof is omitted, for convenience of the description.

Figure 15:
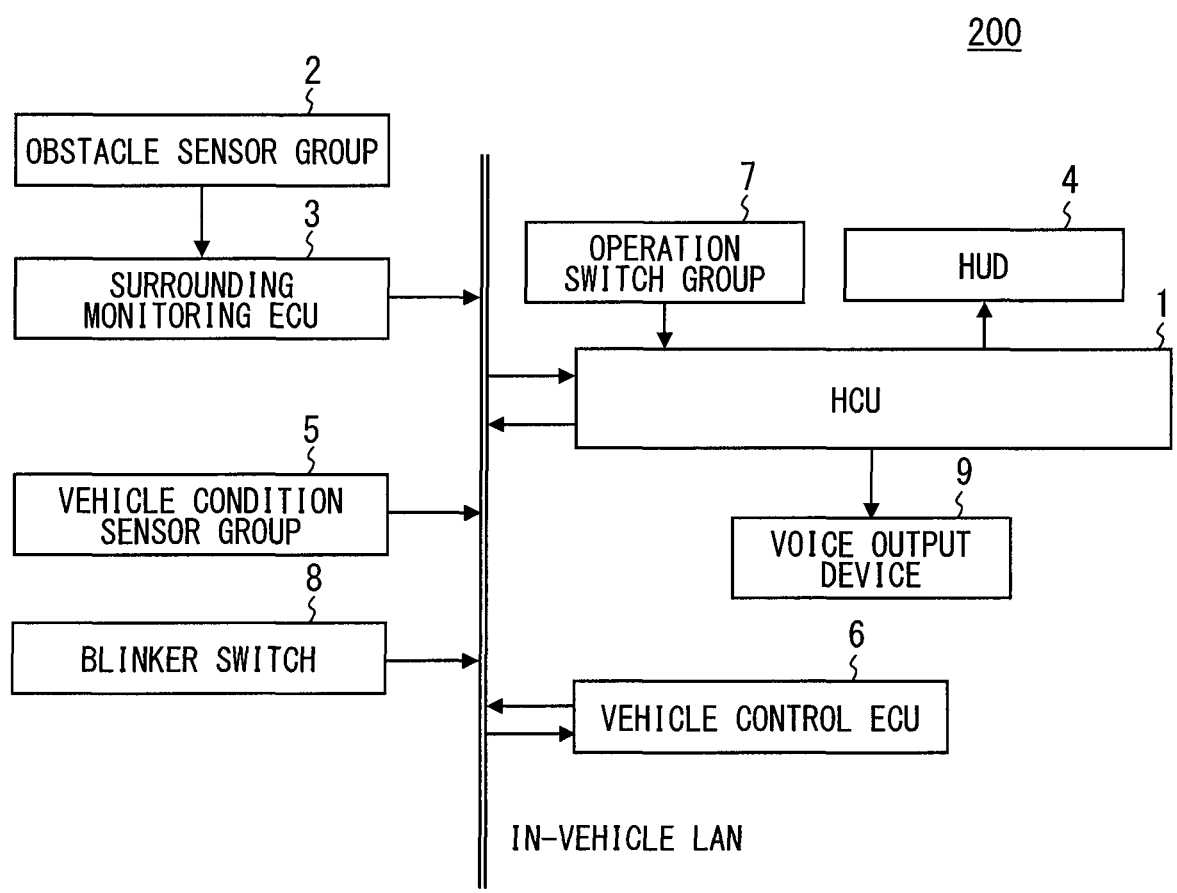
FIG. 15 is a block diagram showing an example of a schematic configuration of an operation support system in a first modification.

As shown in FIG. 15, an operation support system 200 of the first modification is similar to the operation support system 100 of the first embodiment except for further including a blinker switch 8 and a voice output device 9, and for including an HCU 1a in place of the HCU 1.

The blinker switch 8 is a switch for detecting lamp lighting operation of a direction indicator (i.e., lighting operation of a blinker lamp) performed by the driver, and is provided so as to detect the lighting operation of right and left blinker lamps. When the lamp lighting operation is performed, the blinker switch 8 outputs a signal indicating the lighting operation of which blinker lamp, the right or left lamps, is performed.

The voice output device 9 is made up of a speaker and the like, and outputs a buzzer sound and a voice in accordance with an instruction from the HCU 1a.

Figure 16:
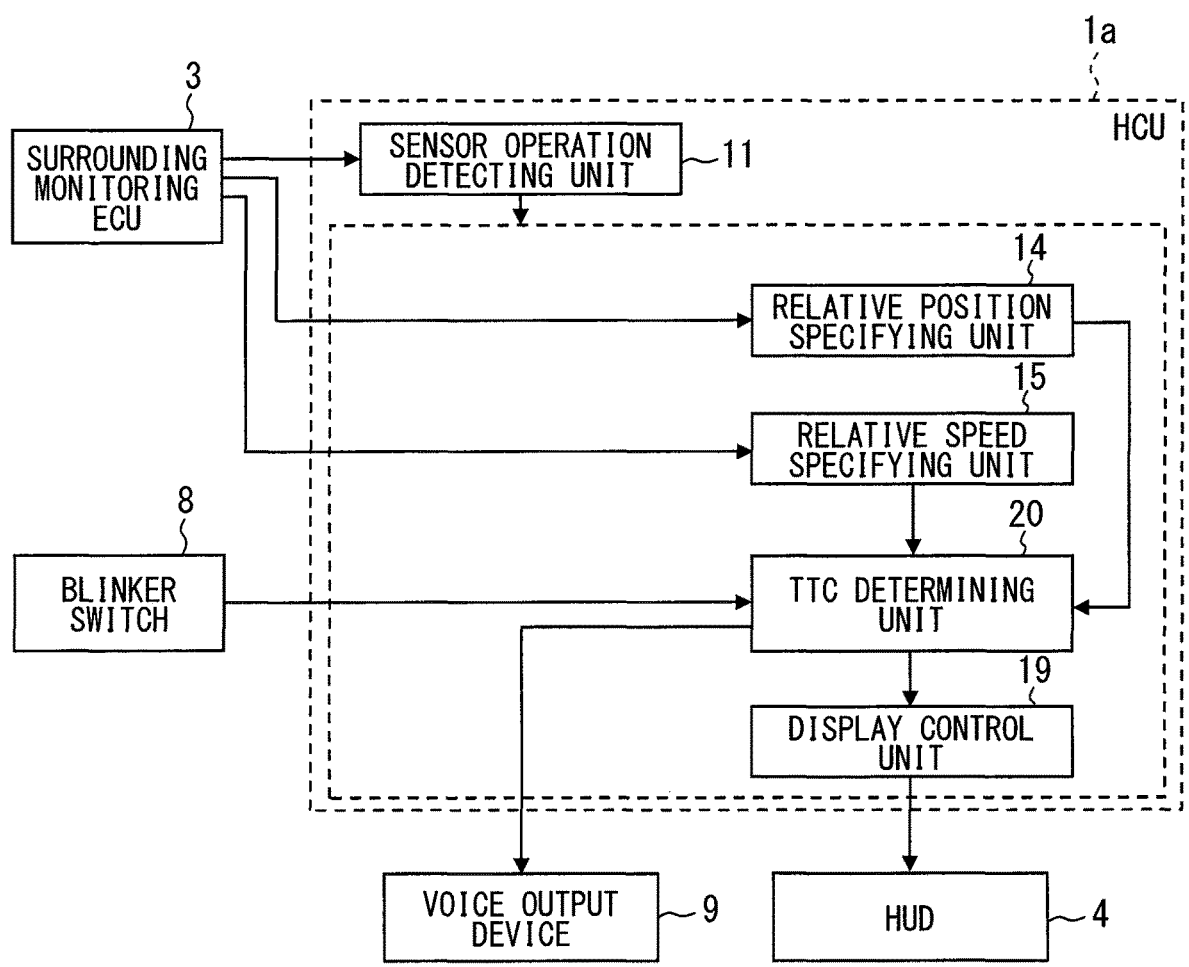
FIG. 16 is a block diagram showing an example of a schematic configuration of an HCU in the first modification.

The HCU 1a includes the sensor operation detecting unit 11, the autonomous-driving determining unit 12, the vehicle speed specifying unit 13, the relative position specifying unit 14, the relative speed specifying unit 15, the detection target area selecting unit 16, the pre-transformation setting unit 17, the projective transformation unit 18, the display control unit 19, and a TTC determining unit 20. That is, the HCU 1a is similar to the HCU 1 of the first embodiment except for including the TTC determining unit 20. Hereinafter, processing in the TTC determining unit 20 is described using FIG. 16. In FIG. 16, of the members included in the HCU 1a, those other than the members required for describing the processing in the TTC determining unit 20 are omitted.

When the relative position of the obstacle with respect to the subject vehicle, which is specified by the relative position specifying unit 14, is within the detection target area range, the TTC determining unit 20 calculates a TTC based on the relative position of the obstacle with respect to the subject vehicle, which is specified by the relative position specifying unit 14, the relative speed of the obstacle with respect to the subject vehicle, which is specified by the relative speed specifying unit 15, and the signal of the blinker switch 8.

As an example, it is estimated whether or not the subject vehicle and the obstacle may collide with each other from a temporal change in the relative position of the obstacle with respect to the subject vehicle. When it is estimated that the subject vehicle and the obstacle may collide with each other, the TTC is calculated by dividing a distance from the current position to the estimated position of collision by the relative speed of the obstacle with respect to the subject vehicle.

When it is estimated that the subject vehicle and the obstacle may not collide with each other, that is, when the obstacle travels on the lane of the subject vehicle or travels alongside on a lane adjacent to the lane of the subject vehicle or when the obstacle travels on the opposite lane to the lane of the subject vehicle, the TTC is calculated to be infinite.

However, even when the subject vehicle and the obstacle may not collide with each other, in a case where a direction to which the obstacle changes its direction can be specified from the signal of the blinker switch 8, it is re-estimated whether or not the subject vehicle and the obstacle may collide with each other on the assumption that the subject vehicle changes its direction to the specified direction. When it is estimated that the subject vehicle and the obstacle may collide with each other, the TTC is calculated by dividing a distance from the current position to the estimated position of collision by the relative speed of the obstacle with respect to the subject vehicle.

Whether or not the subject vehicle and the obstacle may collide with each other may be estimated based on whether or not a prediction trace of the subject vehicle which can be predicted from a temporal change in the current position of the subject vehicle detected using the receiver for use in the satellite positioning system crosses with a prediction trace of the obstacle which can be predicted from a temporal change in the relative position of the obstacle with respect to the subject vehicle.

When the TTC calculated as described above is below the set value, the TTC determining unit 20 causes the voice output device 9 to output a warning sound. Further, when the TTC calculated as described above is below the set value, the TTC determining unit 20 notifies the display control unit 19 that the TTC is below the set value. The set value mentioned here is an arbitrarily settable value and is set to, for example, 3.2 seconds.

The display control unit 19 receiving the notification of the TTC being below the set value transmits, to the HUD 4, an icon image indicating warning (hereinafter, a warning icon image) and an icon image indicating the direction to which the subject vehicle changes its direction (a direction change icon image) so as to be superimposed on the detection target image and the obstacle notification image. This results in projection of the warning icon image and the direction change icon image onto the windshield along with the detection target image and the obstacle notification image.

Figure 17A:
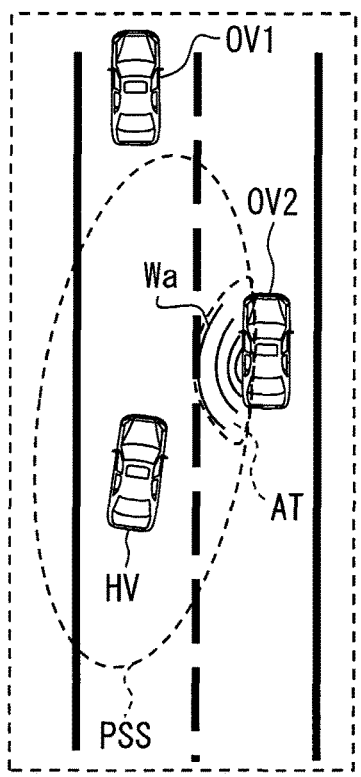
FIGS. 17A and 17B show an example of display of an icon image for warning about collision with an obstacle.
Figure 17B:
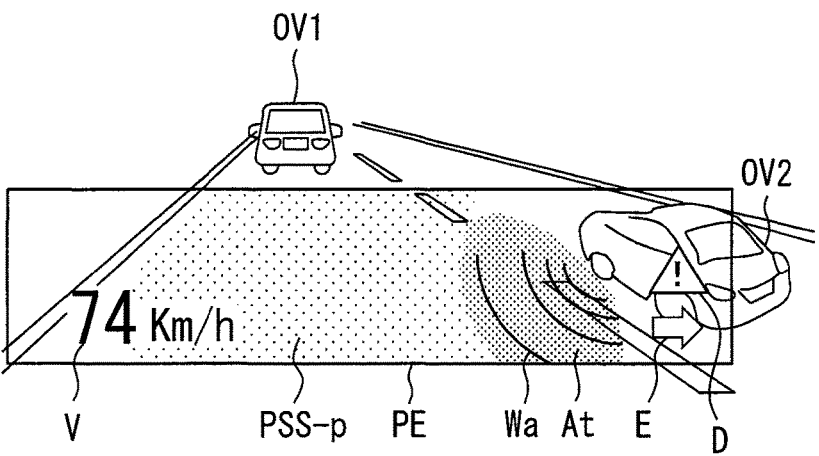

Herein, an example of display of the icon image for warning about collision with the obstacle is described using FIGS. 17A and 17B. FIGS. 17A and 17B take as an example the case of changing to a lane on the right side of the subject vehicle on which the obstacle is present during autonomous-driving. In FIGS. 17A and 17B, symbol D denotes the warning icon image, and symbol E denotes the direction change icon image.

When an overtaking vehicle (OV2 in FIGS. 17A and 17B) is detected diagonally on the front right of the subject vehicle, the obstacle notification area represented in yellow and the detection target image including the arc-like ripples are displayed. In a case where the TTC with the overtaking vehicle is below the set value when the subject vehicle changes its lane to the lane on the light side, the warning icon image as shown in FIGS. 17A and 17B (D of FIGS. 17A and 17B) is displayed as well as the obstacle notification area represented in yellow and the arc-like ripples, to notify the risk of collision with the overtaking vehicle. Further, not only the warning icon image but also the direction change icon image indicating the changing direction (E of FIGS. 17A and 17B) is displayed.

When the subject vehicle does not change its lane to the lane on the light side, the TTC with the overtaking vehicle is not below the set value, and hence the warning sound is not outputted or the warning icon image is not displayed while the obstacle notification area represented in yellow and the arc-like ripples are displayed.

As described above, according to the first modification, only when the time remaining until estimated collision of the subject vehicle and the obstacle with each other is below the set value, the warning sound is outputted and the warning icon image is displayed in addition to display of the obstacle notification area represented in yellow and the arc-like ripples. Accordingly, so long as there is a risk of collision with the obstacle, special warning such as the output of the warning sound and the display of the warning icon image is performed, thereby making the driver aware of the risk of collision with the obstacle.

Although FIGS. 17A and 17B show the example of the case where the subject vehicle changes lanes, needless to say, the modification is not limited to the case of the lane change, but also applicable to the time of turning right or left at an intersection. Further, although the configuration is shown where the changing direction of the subject vehicle is specified from the signal of the blinker switch 8, when a switch for the driver to instruct the changing direction of the subject vehicle is provided in the subject vehicle other than the blinker switch 8, the changing direction of the subject vehicle may be specified from the signal of the provided switch.

Second Modification

The foregoing embodiment shows the configuration where, even when the obstacle sensor group 2 is in operation, the blue detection target image is not displayed in the case of the subject vehicle being in non-autonomous-driving. However, the configuration is not necessarily limited thereto. For example, even when the subject vehicle is in non-autonomous-driving, if the obstacle sensor group 2 is in operation, the blue detection target image may be displayed in a similar manner as in the case of autonomous-driving.

Third Modification

When it is specified that the obstacle detected by the surrounding monitoring ECU 3 is located on the opposite lane to the subject vehicle, it is preferable not to display the obstacle notification area and the arc-like ripples for the obstacle located on the opposite vehicle to the subject vehicle.

It may be specified that the obstacle is located on the opposite lane to the subject vehicle by, for example, recognizing an image captured by the camera for capturing an image of the road surface in front of the subject vehicle to detect a center line and performing the specification based on the obstacle being located on the opposite side to the lane of the subject vehicle with the center line placed therebetween. In this case, the obstacle sensor group 2 is configured to include the camera for capturing the image of the road surface in front of the subject vehicle. It goes without saying that another method may be used when the obstacle located on the opposite lane to the subject vehicle can be identified by using another method.

According to the second modification, there is no need for displaying the obstacle notification area or the arc-like ripples as to the opposite vehicle located on the opposite lane to the subject vehicle, thus enabling prevention of the inconvenience due to display of the obstacle notification area and the arc-like ripples every time the opposite vehicle and the subject vehicle pass by each other.

Fourth Modification

The foregoing embodiment describes the configuration in that the obstacle notification area is displayed in yellow and the detection target area except for the obstacle notification area is displayed in blue, but the configuration is not necessarily limited thereto. For example, the obstacle notification area and the detection target area except for the obstacle notification area may be displayed in other colors so long as those areas have different colors. When the colors are to be made different, the configuration is not limited to that the hue such as yellow and blue is made different out of the color attributes, but saturation or color intensity may be made different.

Fifth Modification

Further, brightness or a color of an image to be projected onto the windshield may be changed in accordance with an environment in which the subject vehicle is. As an example, the brightness and the color intensity of the image are lowered at night to make the image easy to view. As another example, in the snow, the brightness and the intensity of the image may be increased, or the color of the detection target area is changed from blue to green, to make the image easy to view. It may be specified to be the night time by use of a time or an illumination sensor. It may be specified to be in the snow by recognizing an image of the road surface captured by the camera and detecting a white color spread across the road surface.

Sixth Modification

As in a case where the subject vehicle is frequently overtaken by the overtaking vehicle, when the obstacle is frequently detected in a certain direction, such as the left side or the right side, seen from the subject vehicle, displaying the obstacle notification image and the arc-like ripples every time of the detection may be suspended, and a fixed color different from the color of the detection target image is displayed in a wide range of the direction in which the obstacle is frequently detected.

Figure 18:
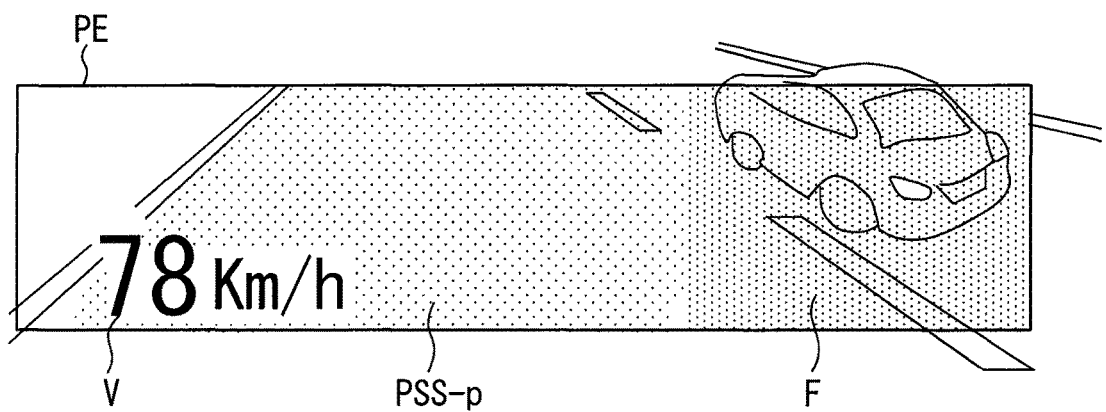
FIG. 18 shows an example of display of an image that is projected onto the windshield when an obstacle is frequently detected in a certain direction.

Whether or not the obstacle is frequently detected may be determined from the number of detection of the obstacle per time. For example, the fixed color may be translucent orange. Further, when the obstacle is frequently detected on the right side of the subject vehicle, the range for display of the fixed color may be a wide range (see F of FIG. 18) in the right direction of the projective plane for projecting the detection target image, as shown in FIG. 18. When the obstacle is frequently detected on the left side of the subject vehicle, the fixed color may be displayed in a wide range in the left direction of the projective plane for projecting the detection target image.

According to the sixth modification, it is possible to prevent the inconvenience due to frequent movement of the obstacle notification image or the arc-like ripples or frequent appearance and non-appearance thereof.

Seventh Modification

The foregoing embodiment describes the configuration in that the projective transformation is performed in the HCU 1 to obtain the detection target image and the obstacle notification image, but the configuration is not necessarily limited thereto. For example, a plurality of patterns of detection target images and obstacle notification images obtained by the projective transformation are previously stored into the memory of the HCU 1 by conditions such as the presence or absence of the obstacle, the direction of the obstacle with respect to the subject vehicle, the relative speed of the obstacle with respect to the subject vehicle, the subject vehicle speed, and the range selectable by the detection target area selecting unit 16, and the detection target image and the obstacle notification image that meet those conditions may be read from the memory.

Eighth Modification

The foregoing embodiment describes the configuration in that the image obtained by the projective transformation in the HCU 1 is displayed so as to be superimposed on the view seen from the driver of the subject vehicle through the windshield of the subject vehicle by use of the HUD 4. However, the configuration is not necessarily limited thereto. For example, the image obtained by the projective transformation in the HCU 1 may be displayed so as to be superimposed on a captured image of the view seen from the driver of the subject vehicle, such as the front view of the subject vehicle.

The eighth modification also enables display of at least how much the detection area by the obstacle sensor covers, in a comparable manner to the view seen from the driver of the subject vehicle, thus leading the driver to instinctively grasp at least how much the detection area by the obstacle sensor covers.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular display control device comprising:
a display control unit for controlling a display device that displays an image so as to be superimposed on a surrounding view of the vehicle;
a relative position specifying unit for specifying a relative position of an obstacle with respect to the vehicle when an obstacle sensor for detecting the obstacle around the vehicle detects the obstacle; and
a relative speed specifying unit for specifying a relative speed of the obstacle with respect to the vehicle when the obstacle sensor detects the obstacle, wherein:
the display device displays an obstacle notification image to be superimposed on an area of the surrounding view of the vehicle;
the area of the surrounding view is disposed in a direction corresponding to the relative position of the obstacle specified by the relative position specifying unit;
the display control unit changes a display mode of the obstacle notification image according to the relative speed of the obstacle specified by the relative speed specifying unit when the display device displays the obstacle notification image;
the vehicle switches between an autonomous driving mode for automatically performing at least one of a steering operation and an acceleration-deceleration operation and a non-autonomous driving mode for performing both the steering operation and the acceleration-deceleration operation in accordance with a driving operation of the driver;
the display control unit displays the detection target image when the vehicle is in the autonomous driving mode; and
the display control unit does not display the detection target image when the vehicle is in the non-autonomous driving mode.

2. The vehicular display control device according to claim 1, wherein:
when the obstacle sensor is in operation, the display control unit displays a detection target image to be superimposed on the surrounding view of the vehicle;
the detection target image is defined by representing a detection target area, which falls in a detection range of the obstacle sensor, and expands from the vehicle to a periphery along a road surface, from a viewpoint of a driver of the vehicle;
when the relative position of the obstacle specified by the relative position specifying unit is within the detection target area, the display control unit displays the obstacle notification image in a boundary area with changing the display mode of the obstacle notification image according to the relative speed of the obstacle; and
the boundary area is disposed in the detection target image, and located in the direction corresponding to the relative position of the obstacle.

3. The vehicular display control device according to claim 2, wherein:
as the relative position of the obstacle specified by the relative position specifying unit is closer to the vehicle, the display control unit increases a ratio between the boundary area and the detection target image, and displays the boundary area.

4. The vehicular display control device according to claim 2, wherein:
the display control unit changes a color of the boundary area in the detection target image to be different from a color of the detection target image other than the boundary area, and displays the boundary area.

5. The vehicular display control device according to claim 2, wherein:
the display control unit displays the obstacle notification image including an arc-like ripple, which expands from the direction in accordance with the relative position of the obstacle, in the boundary area of the detection target image.

6. The vehicular display control device according to claim 5, wherein:
when the display control unit displays the arc-like ripple in the boundary area, the display control unit displays the arc-like ripple so as to be seen as if the arc-like ripple moves in an expanding direction of the arc-like ripple;
when the display control unit displays the arc-like ripple in the boundary area, the display control unit displays the arc-like ripple so as to be narrower an interval between adjacent wave patterns of the arc-like ripple as the relative speed of the obstacle specified by the relative speed specifying unit increases; and
when the obstacle specified by the relative position specifying unit is located on an opposite traffic lane to the vehicle, the display control unit does not display the arc-like ripple with respect to the obstacle located on the opposite traffic lane.

7. The vehicular display control device according to claim 2, wherein:
the vehicle switches between an autonomous driving mode for automatically performing at least one of a steering operation and an acceleration-deceleration operation and a non-autonomous driving mode for performing both the steering operation and the acceleration-deceleration operation in accordance with a driving operation of the driver;
when the vehicle is in the autonomous driving mode, and the relative position of the obstacle specified by the relative position specifying unit is within the detection target area, the display control unit displays the detection target image, and displays the boundary area with changing the display mode of the boundary area in the detection target image; and
when the vehicle is in the non-autonomous driving mode, and the relative position of the obstacle specified by the relative position specifying unit is within the detection target area, the display control unit does not display the detection target image but displays an image indicative of a presence of the obstacle in the direction in accordance with the relative position of the obstacle.

8. The vehicular display control device according to claim 1, further comprising:
a selection unit for selecting a range, in which the detection target image expands, from a plurality of range stages based on an input operation of the driver, wherein:
the display control unit displays the detection target image, on the display device, in the range selected by the selection unit so as to be superimposed on the surrounding view of the vehicle.

9. The vehicular display control device according to claim 1, further comprising:
a vehicle speed specifying unit for specifying a speed of the vehicle, wherein:
the display control unit expands a range of the detection target image not beyond the detection range of the obstacle sensor as the vehicle speed specified by the vehicle speed specifying unit increases, and displays the detection target image; and
the display control unit narrows the range of the detection target image as the vehicle speed specified by the vehicle speed specifying unit decreases, and displays the detection target image.

10. The vehicular display control device according to claim 1, wherein:
the display device is a head-up display device; and
the display control unit displays the image using the head-up display device, so as to be superimposed on a view seen from the driver of the vehicle, through a windshield of the vehicle.

11. A vehicular display control device comprising:
a display control unit for controlling a display device that displays an image so as to be superimposed on a surrounding view of a vehicle;
a relative position specifying unit for specifying a relative position of an obstacle with respect to the vehicle when an obstacle sensor for detecting the obstacle disposed around the vehicle detects the obstacle; and
a relative speed specifying unit for specifying a relative speed of the obstacle with respect to the vehicle when the obstacle sensor detects the obstacle, wherein:
the display control unit controls the display device to display an obstacle notification image so as to be superimposed at an area of the surrounding view of the vehicle located in a direction in accordance with the relative position of the object specified by the relative position specifying unit; and
when displaying the obstacle notification image, the display control unit changes a display shape of the obstacle notification image in accordance with the relative speed of the obstacle specified by the relative speed specifying unit.

12. The vehicular display control device according to claim 11, wherein:
when displaying the obstacle notification image, the display control unit changes the display shape of the obstacle notification image in accordance with the relative speed of the obstacle in a direction different from a travelling direction of the obstacle.

13. The vehicular display control device according to claim 11, wherein:
the area of the surrounding view of the vehicle is disposed between the vehicle and the obstacle.

* * * * *